Feb. 26, 1957 G. W. BECK ET AL 2,782,495
JOINING OF METALS
Filed Oct. 14, 1953
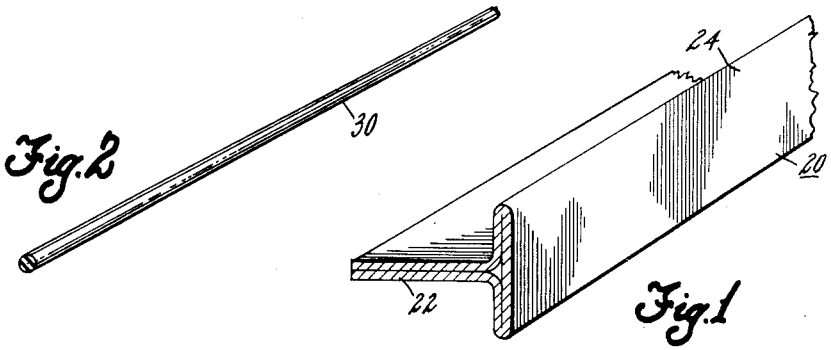
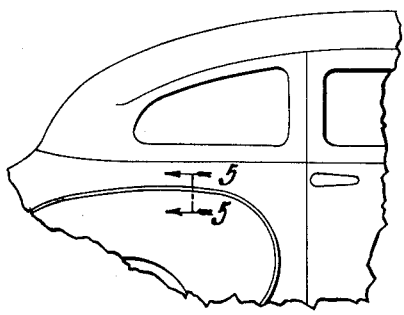
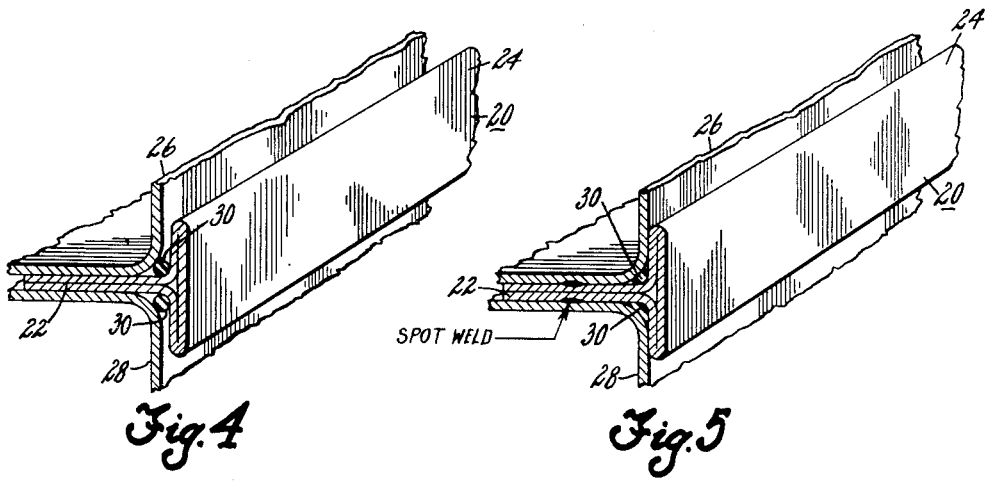
INVENTORS
GEORGE W. BECK
HOWARD F. RENTZ
BY
THEIR ATTORNEY United States Patent Office 2,782,495
Patented Feb. 26, 1957

2,782,495

JOINING OF METALS

George W. Beck, Dayton, Ohio, and Howard F. Rentz, Detroit, Mich., said Beck assignor to General Motors Corporation, Detroit, Mich., a corporation of Delaware and said Rentz assignor to Briggs Manufacturing Company, Detroit, Mich., a corporation of Michigan Application October 14, 1953, Serial No. 386,049

2 Claims. (Cl. 29—450)

This invention relates to a method for joining metal panels and to joining assemblies for carrying out such a method.

It is an object of the invention to provide a method and structure for joining metal panels wherein the joint is weatherproof, ornamental and free from vibration during use thereof.

In carrying out this object, it is an object also to provide a method and structure for joining sheet metal parts, for example, a fender to a body of an automobile wherein an ornamental joining structure is utilized which prevents vibration between the body and fender which reduces vibration noises and which is also weatherproof in nature and prevents rusting and the like at the joint.

Further objects and advantages of the present invention will be apparent from the following description, reference being had to the accompanying drawings, wherein preferred embodiments of the present invention are clearly shown.

In the drawings:

Fig. 1 is a perspective view of a T-strip used in the joining structure.

Fig. 2 is a perspective view of a rubberlike joining bead.

Fig. 3 is a fragmentary view showing a fender and its connection to an automotive body.

Fig. 4 is a fragmentary, sectional view in perspective showing the joining structure during assembly thereof between two metal members.

Fig. 5 is a fragmentary, sectional view in perspective of a finished joint between various sheet metal members.

In the joining of sheet metal members and particularly in the fabrication of automotive bodies and the like, numerous problems arise at the joined portions of sheet metal panels, fenders, and the like. These problems are three-fold; first, if the joints are not well sealed, considerable rusting occurs which eventually erodes the body or fender to a point that replacement or repair is necessary; second, if the joints are not tight in their metal-to-metal contact, the body is noisy, due to vibration and chattering between the various sheet metal parts; and, third, such joints are generally unsightly and require considerable body finishing to provide a satisfactory appearance.

This invention overcomes all of these past problems and provides a joining structure and method for making same which permits welding of panels, one to the other, through an ornamental bead which is weatherproof and rattleproof in its construction.

Referring specifically to the drawings, one form of the invention is shown wherein a fender is being joined to a body of an automobile, it being understood that this showing is merely illustrative of one application of the present invention.

We prefer to utilize a joining strip of an ornamental nature as shown in Fig. 1 at 20. This strip is preferably of a generally T-shaped cross section and includes a leg member 22 having a cross member 24 attached thereto. This T-shaped strip may be formed from a single piece of metal as shown or it may be fabricated from several pieces as desired. The outer surface of the strip 20 on the T portion 24 is preferably well finished and may be plated if desired.

In forming a joint by the method defined herein, two panels of sheet metal, for example, a body member 26 and a fender member 28, as shown in Fig. 4, each having an inturned flange thereon, are assembled so as to leave a space therebetween. The leg portion 22 of the strip 20 is forced into this space. In order to seal in weathertight relation the T strip 20 to the body members 26 and 28, two beads 30 of rubberlike material, to be described hereinafter, are placed at the joining portion of the leg 22 and the T section 24 of the strip 20. These beads 30 fit within the curvature of the T strip and the body members, as noted, and when the T strip is driven home into the space between the body members, these beads are distorted so as to completely fill the space as noted in Fig. 5. When held in this position, a spot-weld is made at spaced points along the body members to firmly attach the body members to the T strip 20. In this manner, a strong joining structure is provided which, due to the distorted beads 30, is fully weatherproof and free from vibration.

The material used in the beads 30 may be any suitable rubberlike material, such as natural rubber, butadiene-styrene copolymers, butadiene-acrylonitrile copolymers, mixtures thereof or any other curable material. The material in the bead 30 is preferably compounded to be of a tacky nature as is well known in the art. This means that the rubberlike compound includes considerable softening agents to make the compound soft and sticky in the uncured condition. This is desirable since as the bead is distorted and deformed into the cracks and crevices between the T-shaped joining strip and the body members, it flows more easily and fills the cracks more thoroughly to prevent subsequent vibration and to also seal the cracks against moisture. The compound of the bead is of a curable nature so that the bead material may be subsequently vulcanized or cured as will be described hereinafter.

Subsequent to the spot-welding operation in the assembly of parts, the assembly is heated to a temperature sufficient to cause a cure in the bead-like structure in the compound of the bead 30. This not only hardens the bead to a degree but it causes adhesion of the bead material to the contiguous metal surfaces whereby a more positive weatherproof joint is formed. In this connection, in the manufacture of automotive bodies, this curing step may be accomplished simultaneously with the baking of the paint finish for the body. In other words, after the body members have been welded together, as noted in Fig. 5, the surface portions thereof are painted with a suitable enamel and the body is then run through a drying oven to bake on the enamel. In this case, the temperature of the oven is sufficient to cause a cure in the bead material. These temperatures usually run between 250° F. and 325° F. wherein the body members are within the oven for a time sufficient to fully cure the rubberlike compound while simultaneously baking the enamel or paint to a desired degree of hardness. Thus, when working with metal surfaces which must be subsequently painted, the cure of the rubber and the baking of the paint is accomplished in one simultaneous step.

It is to be understood that if a cure is not desired, due to the fact that the appearance of the part is not of major importance, the tacky rubberlike compound may be used per se, in which case, it remains in the joint in a sticky condition until air cured which requires a considerable length of time. However, in many cases, this condition is not undesirable for, in such cases, the use of an air cure may save time and expense.

It is further apparent that while the description herein has been directed in the main to the formation of joints between portions of an automotive body that any two sheet metal members may be joined in a similar fashion and that the specific structure shown may be modified to meet structural shapes and conditions without departing from the spirit of the invention, the basic feature of which is directed to the joining strip having tacky rubberlike gaskets or bead-like material fully conformed to the joining surfaces for preventing creepage of moisture therealong and for preventing vibration noises in the finished product. It is also apparent that instead of welding the parts together, they may be joined by bolts, rivets or other conventional means.

While the embodiments of the present invention as herein disclosed, constitute preferred forms, it is to be understood that other forms might be adopted.

What is claimed is as follows:

1. In a method for joining two sheet metal parts having inturned flanges along the joining surfaces, the steps comprising; providing a joining strip of a substantially T-shaped cross section, providing elongated, uncured, tacky rubberlike beads, placing said beads on either side of said joining strip, forcing the leg portion of the joining strip between said flanges and simultaneously deforming said beads into weatherproof fillets at the contiguous portions of the T and the parts to be joined, holding the flanges in position with respect to the joining strip, welding the said flanges and the leg of the T at spaced points therealong while in the bead material in deformed condition, and subsequently curing the rubberlike material in the beads for causing the same to bond to the contiguous metal surfaces and form a weatherproof seal therebetween.

2. In a method for joining two sheet metal parts having inturned flanges adjacent the joining surfaces thereof, the steps comprising; providing an elongated, uncured and tacky rubberlike bead, placing said bead in the joint between said sheet metal parts and adjacent the inturned flanges thereof, permanently deforming the bead into a weatherproof fillet within said joint so as to contact contiguous parts of the two metal sheets, permanently joining the flanges of said sheets and then curing the tacky rubberlike material to cause the same to bond to the contiguous metal surfaces.

References Cited in the file of this patent

UNITED STATES PATENTS

| | | |
|---|---|---|
| 1,161,430 | Wiedeman | Nov. 23, 1915 |
| 1,515,996 | Buchanan | Nov. 18, 1924 |
| 1,715,694 | Coddington | June 4, 1929 |
| 2,172,806 | Probeck | Sept. 12, 1939 |
| 2,587,840 | Gruetjen | Mar. 4, 1952 |
| 2,597,841 | Ridgway | May 20, 1952 |
| 2,620,552 | Jenkins | Dec. 9, 1952 |